United States Patent [19]
Birchfield et al.

[11] 4,428,308
[45] Jan. 31, 1984

[54] LINEAR DOWN-DRAFT BIOMASS GASIFIER

[75] Inventors: Jerry L. Birchfield, Decatur; Albert P. Sheppard, Jr., Tucker, both of Ga.

[73] Assignee: Georgia Tech Research Institute, Atlanta, Ga.

[21] Appl. No.: 326,046

[22] Filed: Nov. 30, 1981

[51] Int. Cl.³ .................. F23L 15/00; C10B 49/02
[52] U.S. Cl. .................... 110/229; 48/111; 48/209
[58] Field of Search ............ 48/76, 111, 346, 209; 110/229, 235; 60/39.12

[56] References Cited

U.S. PATENT DOCUMENTS

| | | | |
|---|---|---|---|
| 2,354,963 | 8/1944 | Ohlsson | 110/31 |
| 2,592,730 | 4/1952 | Perkins | 110/31 |
| 2,965,052 | 12/1960 | Wernheim et al. | 110/229 |
| 3,064,592 | 11/1962 | Eberhardt | 110/7 |
| 3,831,535 | 8/1974 | Baardson | 110/8 C |
| 3,841,851 | 10/1974 | Kaiser | 48/111 |
| 3,881,885 | 5/1975 | Wagner | 48/76 |
| 4,117,786 | 10/1978 | Brose | 110/229 |
| 4,164,397 | 8/1979 | Hunt et al. | 48/209 |
| 4,172,431 | 10/1979 | Tatem et al. | 122/5 |
| 4,213,404 | 7/1980 | Spaulding | 110/229 |
| 4,268,274 | 5/1981 | Caughey | 48/111 |
| 4,280,415 | 7/1981 | Wirguin et al. | 110/224 |
| 4,306,506 | 12/1981 | Rotter | 110/229 |

Primary Examiner—Edward G. Favors
Attorney, Agent, or Firm—Newton, Hopkins & Ormsby

[57] ABSTRACT

A biomass gasification method and apparatus employs a rectangular design and linear injection of feedstock to allow compact modular design to accommodate a wide variety of energy demands with a single-size production unit which can be stacked with others for different energy output demands. The method and construction make use of a long and narrow grate in combination with an air supply system and producer gas return system which uses a down-draft technique to restrict and control by-products and to improve the efficiency of the energy conversion system.

7 Claims, 3 Drawing Figures

LINEAR DOWN-DRAFT BIOMASS GASIFIER

BACKGROUND OF THE INVENTION

1. Field of the Invention

This invention relates to an improved method and apparatus for the gasification of cellulosic biomass to produce low BTU gas to be used as a fuel in various agricultural and industrial applications.

2. Description of the Prior Art

The consumption of combustible solid to produce low BTU gas products in a most efficient manner has received much attention in the past several years due to the energy shortage. The search for other sources of fuel for agricultural and industrial applications has led to the construction of gasifiers which use organic material in the form of refuse, wood or other solid carbonaceous material.

The burning of refuse material in incinerators which use excess air to limit flame temperatures have produced large amount of effluent gases to be handled by gas cleaning equipment which must be of a tremendous size in order to handle the volume of gas generated. Other problems with regard to normal incinerator type of operation involves the filtration of incinerator fumes which have proved impractical because the odors generated are of a complex chemical nature not possible to filter out. Other absorption and catalytic agents including masking agents used as counter-odorents have proved equally unsatisfactory. Industrial gas producers of the prior art type use separation, drying and grinding and other preparation prior to the actual gasification process with a downward gravitation flow of the refuse fuel and an upward flow of the gaseous and vaporous products. This upward flow of the vaporous products provides difficulty in the collection process and tends to harm the structure of the furnace due to the nature of the smoke products formed on the surfaces. Furthermore, these gasification apparatus' operate at pressures exceeding ambient atmospheric pressure such that leakage of noxious fumes can be a problem.

One of the most common techniques of providing a conversion of biomass material to gas involves the use of a dumping of the material into container which has a grate near the bottom. The material is mixed with combustible air which is force-fed and the burning product produces the gas which is pumped away from the source. The purpose of the grate is to provide a surface which allows for a complete burn up of the product and the removal of the ash away from the combustion area so that the heat is not "washed" on completely combusted material.

Other construction such as shown by the patent to Giddings U.S. Pat. No. 3,746,521 disclose the removal of the waste material by means of a ram 41 which essentially functions to push out the material at the bottom of the combustion chamber. This construction of a ram, while providing for the removal of material does not function in an efficient manner with regard to the burning of the product because the ram pushes away material which may contain some product not fully burned and thus reduces the efficiency of the process. Thus the use of a grate in this type of biomass gasification process is seen to be the most reliable for efficiency of conversion and minimization of heat loss on already fully combusted products.

The prior art type of constructions involving the use of grates have mainly circular type grates which are placed at the bottom or near the bottom of a gasification chamber. These grates essentially must not only function to filter the completely combusted product but also must serve to aid or, in some cases fully support the suspension of the fuel material. That is these grates must be strongly constructed so that they can withstand the weight of the biomass which is being converted to gas. This can many times be a problem because of the nature of the material of the grate as well as the high temperatures involved in the process which could weaken the biomass suspension ability of the grate. This is particularly true in large volume gasifiers where the weight of the biomass becomes a problem on the grate structure. This problem is particularly relevant when the grate is of a circular construction due to the nature of the high temperatures which occur at the support device for the grates and at the surface of the grate.

Other problems involved in the prior art use of grate construction include the necessity for increasing the area of a circular grate each time the biomass handling capacity was to be increased which further increased the problem with regard to materials. Likewise the large circular zone designs for grates and therefore for combustion zones provides problems with scaling production capacities and requires the use of complex gas removal and ash removal mechanisms.

The present invention proposes a biomass gasifier which uses a linear construction of the grate and combustion zones in combination with a down-draft operation to provide a gasifier which overcomes the above-mentioned problems.

SUMMARY OF THE INVENTION

Accordingly, one object of this invention is to provide a novel down-draft gasifier whose linear design allows for compact modular design in order to accomodate a wide variety of energy demands for the single size product unit that can be "stacked" with others for producing different energy output demands.

Another object of the present invention is to allow the linear or rectangular shape to provide feedstock introduction into the combustion area without deterioration of the air injection flow path or the grates.

A still further object of the invention is to combine the use of a preheater that is self-sustained to give greater combustion efficiency and to allow the use of a moist fuel.

The above objects are accomplished through the use of a gasifier having a long and narrow grate with a combustion air being introduced through a preheater into the combustion zone through a manifold along the entire length of the active zone of the reactor immediately above the grate, which grate functions only to support the fuel and is not exposed to high heat of the combustion zone. The hot producer gas is forced through a preheater in which heat is removed from the producer gas in exchange with incoming cold combustion air to form the heat for the heat exchanger to feed through the manifold to support the combustion. The producer gas also supplies heat to be fed through the biomass material in order to remove the moisture before it is fed to the gasifier vessel. The air which is supplied through the manifold operates in such a manner that the combustion takes place in a down-draft environment which prevents the residue and by-products from collecting on the walls of the vessel and completely burns off these products and converts them to hydrocarbon molecules which become part of the fuel.

BRIEF DESCRIPTION OF THE DRAWING

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENTS

Figure 1:
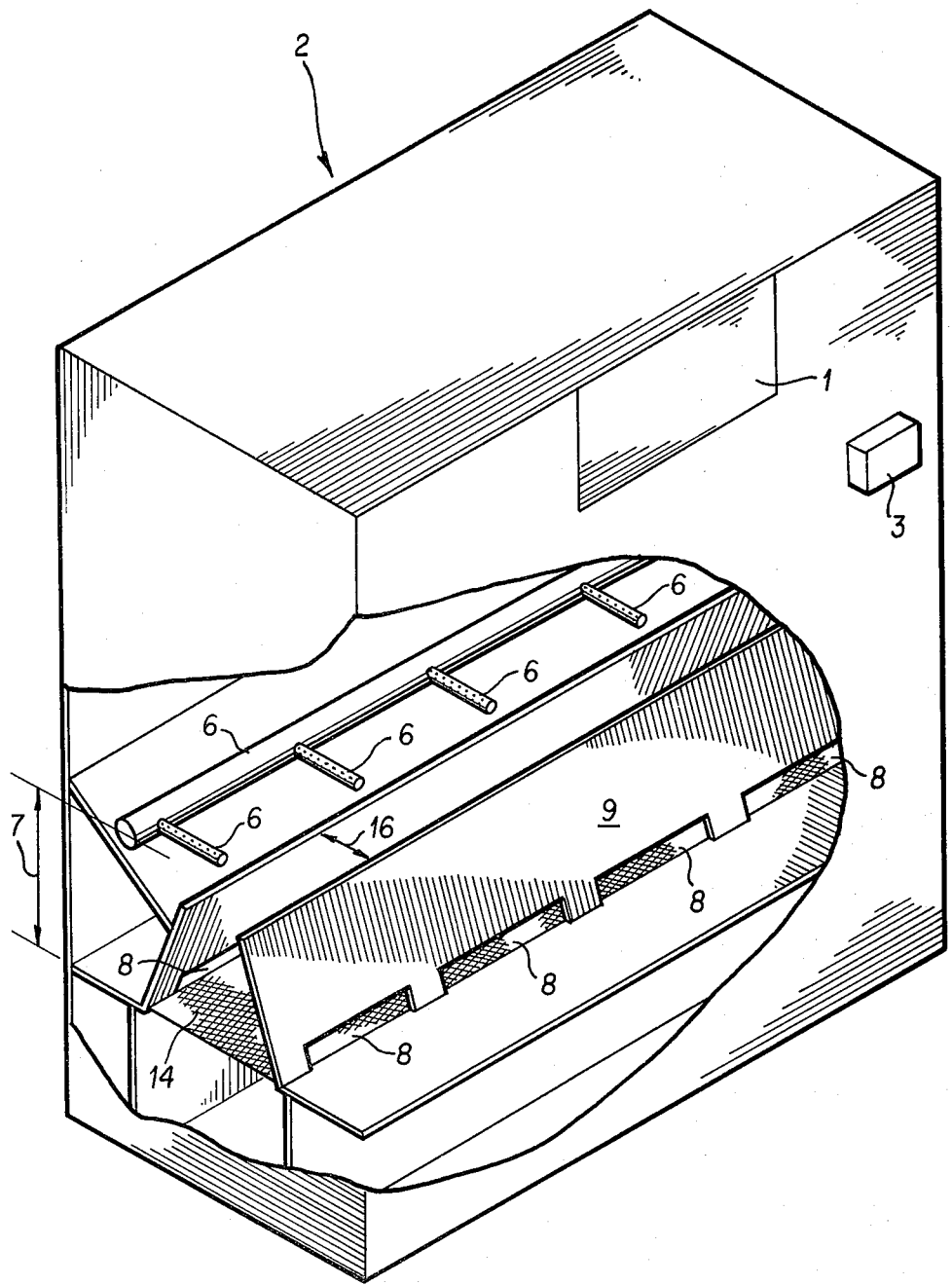
FIG. 1 shows a cut away view of the linear gasifier reactor vessel.
Figure 2:
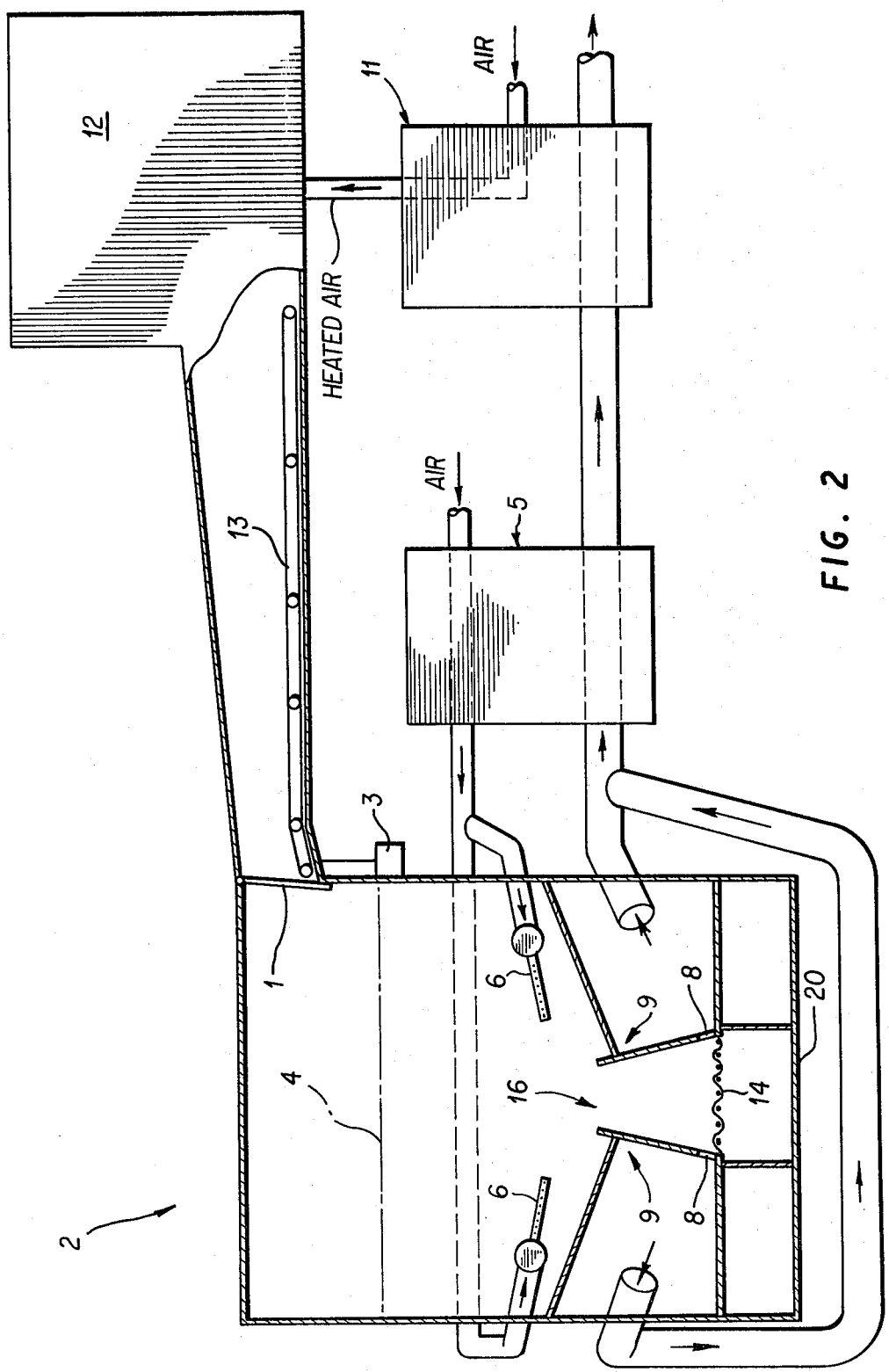
FIG. 2 shown a cross-section of the gasifier system.

Referring now to the drawings, wherein like reference numerals designate identical or corresponding parts throughout the several views, and more particularly to FIGS. 1 and 2 thereof, there is shown a reactor vessel 2 into which the biomass feedstock is introduced through an air lock 1 aperiodically upon demand from a level controller 3 which senses the level of the feedstock bed 4. When the fuel has been depleted below a certain amount of control signal from the level controller 3 is fed to the airlock 1 to open in order to resupply the material to the vessel. The biomass is supported by the two portions of the fuel suspension bed 9 and the grate 14. Combustion of the fuel takes places in a zone having combustion air being introduced through a preheater 5 into the combustion zone through a manifold 6 along the entire length of the active zone 7 of the reactor. In this zone a small part of the biomass fed stock is combusted to produce heat. The heat and part of the combustion air are used to subsequently cause partial oxidation of the carbon in the biomass feedstock which is converted into CO. Pyrolysis oils are produced in and above the combustion zone and are ducted through the zone where, in the presence of the high temperatures created, they are cracked to form lighter hydrocarbon molecules. These molecules then become part of the fuel. The hot producer gas which flows through the series of vents 8 in the bed suspension unit 9, is forced through the heat exchanger/preheater 5 where heat is provided for the combustion air which is introduced through the manifold 6. A further heat removing system is shown at 11 which produces heat for drying the biomass feedstock in container 12 before it is fed via a conveyor 13 to the airlock 1 which dumps the feedstock into the reactor vessel 2 in response to the output of the level controller 3.

The grate 14 is constructed of a rectangular design having a long and narrow structure to minimize the fuel suspension problems. That is, the bed suspension unit 9 functions to funnel the entire biomass feedstock and byproducts through the opening 16 to the grate 14. Because of the narrow construction of the grate the materials problems with regard to strength of the grate have been minimized and an increase in the production capacity of the system is merely accomplished by added another unit similar to the reactor vessel 2 alongside the illustrated unit. The grate 14 functions to allow the completely combusted materials to drop to the bed 20 of the reactor vessel where they can be removed and at the same time assures complete combustion of all materials before they is turned to ash and filtered through the grate. A further saving with regard to the grate is involved in the efficient use of the heat produced in the combustion process as none of the heat is wasted on the ash products and no space is taken up by the ash products in the combustion zone.

The above construction provides a rectangular down-draft gasifier which can be manufactured at a low cost and which will be modular. The down-draft design yields high-quality gas having very low levels of entrained tar and particulate. Tar minimization and control is important because tar condensate is difficult to combust or to dispose of. Up-draft designs, which involve a flow of air in the upward direction, require extensive combustive redesign and require tight operational controls because the tar and particulate matter tend to be entrapped on the sides of the reactor vessel and furthermore these molecules from these oils produced do not remain in the high temperature zones and therefore are not cracked to form lighter hydrocarbon molecules which return to become part of the fuel. These problems do not occur in the down-draft design because the particulate matter and oils formed are produced in and above the combustion zone and are ducted through the zone where, in the presence of the high temperatures, they are cracked to form lighter hydrocarbon molecules and are returned to become part of the fuel.

The gasifier produces a low BTU gas comprising CO, $H_2$, $CH_4$, $CO_2$, $N_2$, and light hydrocarbon gases as the predominant product as well as ash and minimal amounts of heavier oils as byproducts. The gasifier primarily uses cellulosic biomass as the feedstock and the low BTU gas produced by the gasifier is useful as a fuel in various agricultural and industrial applications including crop drying, heat engines and process and curing heat generation.

The linear design of the gasifier vessel instead of the more conventional cylindrical design provides an easy approach to scale-up. In the linear design the long narrow grate 14 is used and the fuel suspension problems are minimized because the grate is narrow. The high temperatures (>2000° F.) which occur at the support device do not have a severe effect on the grate material when the grate is a narrow construction and is removed from the combustion zone. Air which is introduced to the surface in order to provide combustion must be introduced uniformly across the surface of the wood being gasified in order to ensure an even and a fast burn, is readily accomplished with the linear design by introducing air along both sides of the narrow grate along its entire length through the manifold 6.

One basic size of unit has been constructed in accordance with the embodiments of FIGS. 1 and 2 which has a size of 2 MM BTU/hr. This system is adequate to meet most evaluation needs. Larger scale units may be combined in batteries of two or three to build systems generating anywhere from 10 to 45 MM BTU/hr. Because a constant grate width is used the grate length is selected to give different generation ratios and as a consequence similar construction methods and components can be used to produce many different capacity systems greatly reducing custom design and parts inventory requirements. The use of the heat from the producer gas provides a fuel quality control before gasification. The reduction of the fuel moisture content increases the gasifier efficiency and the gas quality produced. The waste heat from the process is used to reduce the fuel moisture content in container 12 to a constant low level as well as to preheat combustion air supplied to the gasifier. The initial costs required by system construction of conventional heat recovery equipment as shown in the FIG. 2 are mitigated by greatly reduced operating cost, higher conversion efficiencies (lower gas cost per unit of wood fuel) and much greater gasifier control.

The test unit designed in accordance with FIGS. 1 and 2 has been constructed and operates with a model linear gasifier capable of producing gas at a rate of 2 MM BTU/hr. Test performed on this unit indicate a gas quality of greater than 140 BTU/scf. The conversion efficiency has been measured in excess of 80%.

Figure 3:
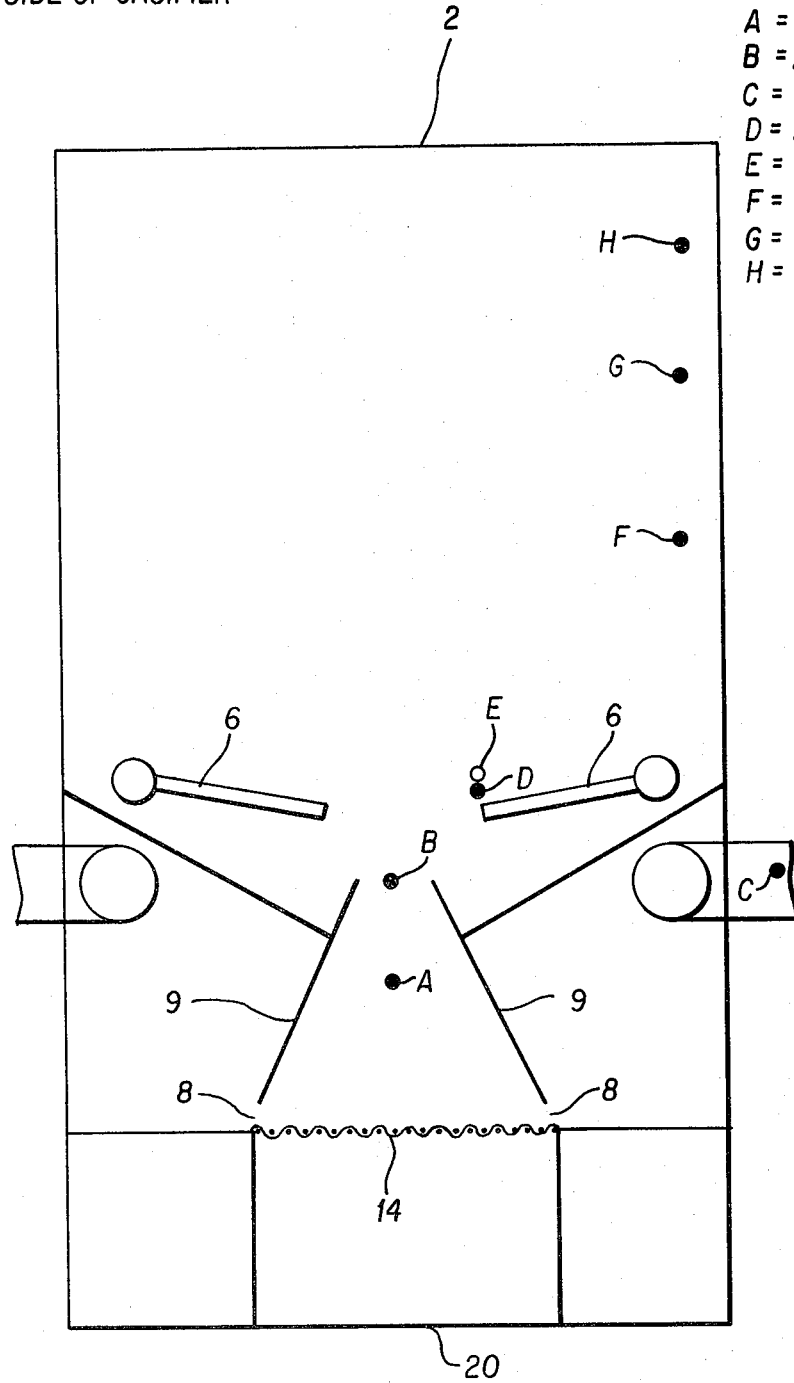
FIG. 3 shows a cross-section of the gasifier having temperature measurement points indicated at various places in the process.

In considering the materials design necessary for the construction of the unit the temperature measurement points in the FIG. 3 indicate a basically low temperature environment at points F, G and H which are in the zone above the combustion area with the temperature increasing to greater than 1200° F. in the combustion areas B and D. The producer gas is taken off at a temperature of between 400° and 500° F. as is shown at the point C. This producer gas temperature provides the heat for the combustion air to be supplied and for controlling the moisture content of the fuel before entering the reactor vessel. It is also noted that the combustion air, because of the nozzle location, may also be partially heated by the hot producer gases located in the plenum structure formed by the sides of the reactor and the bed suspension unit 9.

Obviously, numerous modifications and variations of the present invention are possible in light of the above teachings. It is therefore to the understood that within the scope of the appended claims, the invention may be practiced otherwise than as specifically described herein.

What is claimed as new and desired to be secured by Letters Patent of the United States is:

1. An apparatus for producing combustable gases from carbonaceous biomass comprising:
   a reaction vessel having substantially vertical walls and an enclosed top and bottom;
   biomass feeding means for feeding moisture controlled biomass into the top of said vessel;
   suspension means located between the top and bottom of said vessel having a first and second portion respectively extending from a pair of opposite walls of said vessel;
   a long and narrow rectangular grate located below said suspension means and between said pair of opposite walls wherein the length of said grate is substantially equal to the distance between the other pair of opposite walls of said vessel;
   combustion air introduction means located substantially adjacent and above said fuel suspension means for introducing preheated air into the portion of the biomass located near the opening formed by the distance between said first and second portions of said suspension means along the entire length of said vessel determined by said other pair of opposite walls;
   producer gas removal means located between said suspension means and said grate for removing gas produced by the combustion of said combustion air and said moisture controlled biomass;
   first heat removing means for removing a first portion of heat from said producer gas supplied from said gas removal means for supplying heating air to said combustion air introduction means; and
   second heat removing means for removing a second portion of heat from said producer gas removed by said gas removal means for supplying heat to control the moisture content of said biomass.

2. The apparatus according to claim 1 wherein said biomass feeding means includes an airlock and a level controller for sensing the amount of moisture controlled biomass in said vessel to control the opening and closing of said airlock.

3. The apparatus according to claim 3 wherein said biomass is cellulosic.

4. The apparatus according to claim 1 wherein said combustion air introduction means includes a manifold extending along said entire length of said vessel.

5. In an apparatus for producing combustible gas from a carbonaceous material having a rectangular vessel reactor construction and a combustion air supply for supplying air to ignite and enhance combustion material fed into said vessel and further having a grate near the bottom of said vessel for both filtering out the fully combusted products and for supporting a portion of the mass of the material in said vessel the improved apparatus comprising:
   a fuel suspension bed having a pair of spaced upwardly and inwardly inclined wall portions extending along the length of said vessel separated by a longitudinally extending opening, and
   a long and narrow grate positioned between a pair of walls of said vessel and below said upwardly and inwardly inclined wall portions and extending from one end of said vessel to the other end such that the width of said grate is approximately less than one-half the width of said vessel and more than twice the width of said opening so as to improve material suspension problems and to allow for modular construction by arranging side-by-side or end-to-end stacking of a plurality of said apparatus.

6. A method of producing combustible gas from carbonaceous biomass comprising the steps of:
   controlled addition of moisture controlled biomass to a rectangular reactor vessel through an airlock;
   controlled addition of heated air uniformly along the entire length of said vessel to said added biomass to induce combustion;
   funnelling said added biomass to a fuel suspension bed having a pair of spaced upwardly and inwardly inclined wall portions extending along the length of said vessel separated by a longitudinally extending opening, and a long and narrow grate positioned between a pair of walls of said vessel and below said upwardly and inwardly inclined wall portions and extending from one end of said vessel to the other end such that the width of said grate is approximately less than one-half the width of said vessel and more than twice the width of said opening so as to improve material suspension problems and to allow for modular construction by arranging side-by-side or end-to-end stacking of a plurality of said rectangular reactor vessels;
   removing completely combusted material from said long and narrow grate near the bottom of said fuel suspension bed;
   removing gases produced by said combustion from a region beneath said biomass materials;

removing a first amount of heat from said produced gas through a series of vents included in the upwardly and inwardly inclined wall portions and supplying said heat to a source of fresh air to produce heated air for the step of controlled addition of heated air; and removing a second amount of heat from said produced gas and supplying said second amount of heat to said biomass to form said moisture controlled biomass.

7. The improved apparatus according to claim 5 wherein said upwardly and inwardly inclined wall portions include a series of vents for removing combustion gas to provide heat to the combustion air which is introduced into said vessel.

* * * * *